July 23, 1935.  A. O. SAMUELS  2,008,799

ELECTRIC TOASTER

Filed March 21, 1932  2 Sheets-Sheet 1

INVENTOR
ABE O. SAMUELS
BY
ATTORNEY

July 23, 1935. A. O. SAMUELS 2,008,799
ELECTRIC TOASTER
Filed March 21, 1932     2 Sheets-Sheet 2
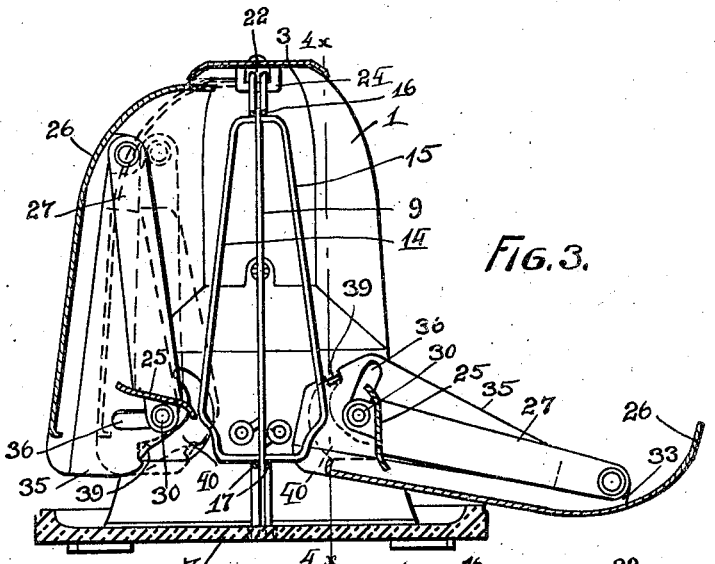
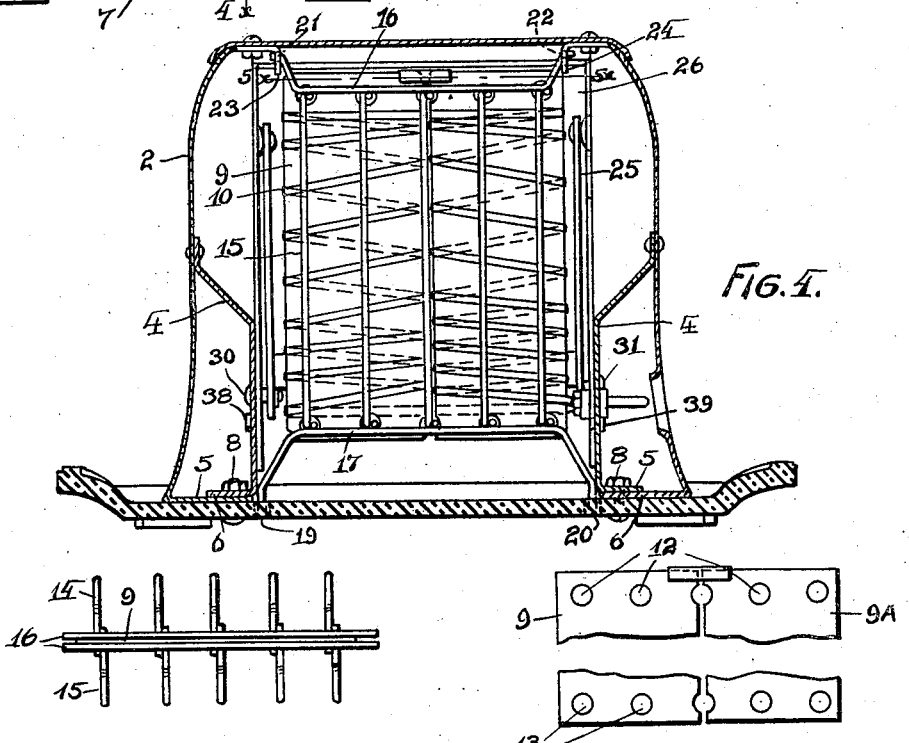
INVENTOR
ABE O. SAMUELS
BY
ATTORNEY Patented July 23, 1935

2,008,799

UNITED STATES PATENT OFFICE 2,008,799

ELECTRIC TOASTER

Abe O. Samuels, Rochester, N. Y., assignor to Samson-United Corporation, Rochester, N. Y.

Application March 21, 1932, Serial No. 600,249

16 Claims. (Cl. 219—19)

This invention relates to electric toasters for bread, rolls etc. and has for its object to provide such a toaster with adjustable toast carriers which automatically adjust themselves to different thicknesses of slices of bread or to two or more slices of bread or to rolls which are placed on these carriers for toasting.

Another object of this invention is to provide a toaster with a bottom tray in which the crumbs from the bread and rolls collect as they drop from the toaster.

A further object of this invention is to provide the toaster with a novel combined guard and heating element support.

These and other objects of this invention will become more readily apparent from the detailed description of the invention which follows, reference being had to the accompanying drawings in which Figure 1 is a front elevation of the toaster.

Figure 3 is a vertical sectional view of the toaster, the section being taken on the line $3x$—$3x$ of Figure 2.

Figure 4 is a vertical sectional view of the toaster, the section being taken on the line $4x$—$4x$ of Figure 3.

Figure 5 is a detail top plan view of the electric grid guard and the grid supported between them.

Figure 6 is a detail elevation of the upper and lower portion of the electric grid mounting.

In the several figures of the drawings like reference numerals indicate like parts.

Figure 1:
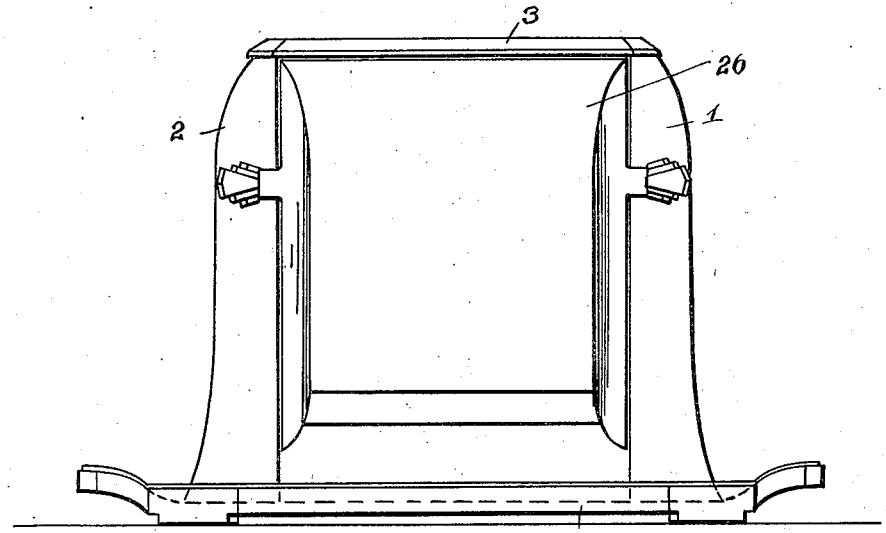
Figure 2:
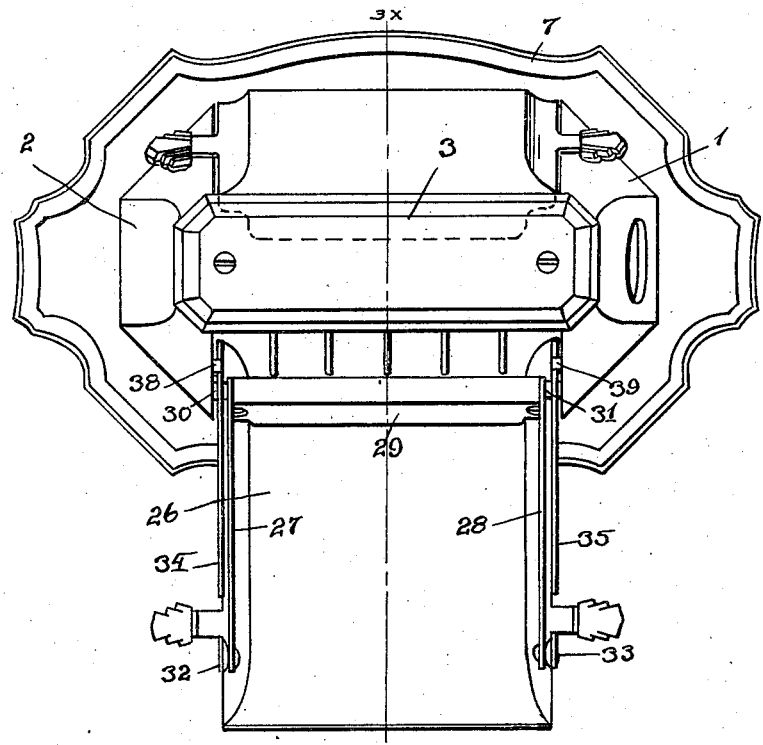
Figure 2 is a top plan view of the toaster with one of the toast carriers in position to receive a slice of bread or a roll.

The electric toaster forming the subject matter of my present invention is provided with a housing which is made up of the closed ends 1 and 2 which support between them the top 3. The lower portion of each of the closed ends is provided with an inner wall 4 which extends vertically from the bottom but is bent inwardly at a point intermediate the top and bottom of the ends where it is suitably attached thereto. The bottom of the ends as well as their inner walls are provided with flanges 5 and 6 respectively which overlap each other. The flange of each end and its inner wall are simultaneously clamped together and anchored to the bottom of the tray 7 by means of one or more bolts 8, 8.

The tray 7 in the center of which the toaster is mounted, as illustrated in Figure 1, is preferably made up of a suitable insulating material such as Bakelite although if desired a metal tray may be used. The tray is concaved and surrounds the housing of the toaster in order to catch and hold the crumbs which drop from the bread or the rolls while they are being toasted. The ends of the tray are preferably curved up and form handles by means of which the tray and toaster are carried.

The heating element for toasting the bread and rolls is provided by a grid which is made up in two parallel sections 9 and 9A. Each of these sections comprises a sheet of mica or other insulating base on which is spirally wound the resistance wire ribbon 10. The ribbon is wound on these two sections so that the grid formed by one section forms a continuation of the other and is in series therewith. Both of the grid sections are mechanically connected together at the top by means of the cleat 11 which is attached to the inner ends of each of the upper corners of the mica base members in order to firmly hold them together. The top and bottom of each of the grid sections is provided with a series of holes 12, 12 and 13, 13 respectively by means of which the grid is anchored and held centrally suspended within the housing as will hereinafter be described.

To prevent the bread or rolls from coming in contact with the heating element and keep the bread and rolls uniformly spaced therefrom, the wire guards 14 and 15 are located in front of the heating element. Each of these guards comprises a series of upright wire members which are bent inwardly at the top and bottom to have a cross wire member 16 and 17 attached to the top and bottom thereof. The upright wire members are thus rigidly connected and evenly spaced at the top and bottom. In attaching the inwardly bent portions of the upright wire members to the cross wire members, the ends of the inwardly projecting end of the upright wire members are allowed to project beyond the cross wire members so that when the two guards are placed together, the projecting ends of the wire members are located alongside of each other and project beyond the cross wire member of the opposing guard as illustrated in Figure 5. The holes 12 and 13 in the top and bottom of the grid sections of the heating element are spaced so that the laterally projecting free ends of the upright wire members of the two guards at the top and bottom thereof will enter these holes when the electric grid sections are placed between them, before the guards are brought together as above described. Placing the guards together with the heating element between them thus automatically locks the heating element to the guards and holds it centrally suspended in a vertical position between the guards.

To hold the guards together with the heating element between them, the lower cross wire members 17 of both guards are bent downwardly parallel to each other, first angularly and then vertically from the guard provided by the vertical wire members so that the vertical ends of both cross wire members jointly enter the holes 19 and 20 provided in the bottom of the tray 7. The engagement of the ends of the cross wire members into these holes then locks the two guards together at the bottom.

The upper ends of the guards are similarly fastened together by holding together the ends of the cross wire members 16, 16. These ends are bent upwardly parallel to each other, first angularly and then horizontally so that the horizontal ends of both cross wire members jointly enter the holes 21 and 22 provided in the lugs 23 and 24 respectively. These lugs project inwardly from the top of the ends 1 and 2 of the housing, and the top of the guards are locked thereto and suspended therefrom by the engagement of the cross wire members into the holes provided in the lugs. In this way the assembly of the guards with the heating element and their attachment in the proper location within the housing is accomplished in a very simple but nevertheless efficient manner.

The toast carriers of the toaster are made up of two members each, the supporting member 25 and the shield or cover 26. The supporting member comprises a pair of parallel arms 27 and 28 which are connected near their lower ends by the horizontal supporting ledge 29 on which the bread or rolls to be toasted are supported. The lower ends of the parallel arms of the supporting member of each toast carrier are pivoted on the pivot studs 30 and 31 which are suitably anchored in the inner walls of the closed ends 1 and 2 of the housing of the toaster. In this way the supporting member of each toast carrier is mounted to swing from a substantially vertical position to a substantially horizontal position between the closed ends of the housing. The cover 26 of the toast carrier is pivoted to the upper ends of the parallel arms of the supporting member thereof and comprises a shield having suitable flanges 32 and 33 bent up on each side thereof to which the upper ends of the parallel arms 27 and 28 are pivotally attached.

Other flanges 34 and 35 are bent up from the sides of the cover 26 which permit the cover to slide in and out between the ends of the housing. In these latter flanges are provided the curved slots 36, 36 thru which pass the pivot studs 30 and 31 on which the supporting member is pivoted as above described. The curved slots 36, 36 permit the lower end of the cover 26 to swing toward or away from the supporting ledge 29 of the toast carrier and thus allow both thick and thin slices of bread or rolls to be supported on the supporting ledge 29 with the shield or cover resting against the back of the bread or roll in order to hold it in contact with the guard in front of the heating element.

While the lower end of the cover or shield of the toast carrier thus independently adjusts itself to different thicknesses of bread or two or more slices of bread placed side by side or rolls supported on the supporting ledge thereof, the upper ends of the parallel arms of the supporting member with the shield pivotally attached thereto can swing toward and away from in front of the guard and thus accommodate different thicknesses of bread, two or more slices placed side by side or rolls between them. In this way the toast carrier will automatically adjust itself to hold different thicknesses of bread in place between the inside of the shield and the guard in front of the heating element by simply placing the slice or slices of bread or roll into the toast carrier on the supporting ledge thereof and closing the toast carrier against the guard of the heating element and when the slice or slices of bread or roll placed in the carrier has a thickness greater than can be accommodated between the guard and the shield or cover 26 of the toast carrier in its innermost position, such a slice or slices of bread or roll will force the lower end of the cover away from the supporting ledge 29 and swing the upper end of the supporting member with the cover hinged thereto away from the guard until the thickness of the bread or the roll has accommodated itself between the cover of the toast carrier and the guard of the heating element.

In order to automatically bring the cover or shield of the toast carrier back to its original position after the thicker slice of bread or roll has been toasted and removed from it so that a thin slice of bread can again be efficiently toasted in the toaster, cam lugs 38 and 39 are struck out from the edge of the flanges 34 and 35 respectively and engage into the cam slots 40, 40 provided in the inner walls 4 of the ends 1 and 2 of the housing. Each of these cam slots is widened at the lower end and narrows as it curves upwardly. In this way the lugs 38 and 39 are free to swing in the enlarged lower portion of the cam slots 40, 40 when the toast carrier is in its vertical position so as to allow the cover and shield to move out and adjust itself to thicker slices of bread or more than one slice of bread or a roll. However when the toast is removed and the toast carrier is swung down from its vertical toasting position to a horizontal filling position, the lugs 38 and 39 move up into the narrow end of the cam slots and in doing so draw the lower end of the shield back to the supporting member. In this way the movement of the toast carrier from a vertical to a substantially horizontal position automatically moves the shield of the toast carrier back to its original position with relation to the supporting member thereof after the shield has been previously moved away from it on the insertion of a thicker slice or more than medium of bread or a roll, as above described. As the toast carrier is swung back to its vertical position, the supporting member and its cover then stay together unless they are again forced apart by a slice or slices of bread or a roll which occupy a larger space than the slice of bread which is ordinarily used for toasting.

I claim:

1. An electric toaster comprising a housing having a heating element mounted therein surrounded by a guard, a toast carrier pivoted on said housing, a cover mounted to swing on the free end of said toast carrier to permit the free end of the cover to swing toward and away from the pivoted end of said toast carrier, a cam slot in said housing and a cam lug carried by said cover and engaging said cam slot, said cam slot being adapted to move said cam lug on the swinging of said toast carrier and swing said cover on said toast carrier.

2. A heating element for an electric toaster comprising an insulating base having openings therethru at the top and bottom thereof, a heating coil wound on said base, combined guard and supporting means in front and back of said insulating base in spaced relation thereto, means provided at the top and bottom of said combined guard and supporting means engaging into said openings of said base and means for holding said guard and supporting means together remotely from said insulating base to suspend and lock said insulating base between said guards.

3. An electric toaster comprising a housing having closed ends, a top and a bottom, a pair of guards, suspension members projecting toward each other at the top and bottom of said guards, a heating element suspended from said suspension members between said guards, locking means in the top of said housing and engaged by the top of said guards and locking means in the bottom of said housing and engaged by the bottom of said guards to lock said guards together with the heating element held suspended between them.

4. In an electric toaster the combination of a housing having a top and bottom, a pair of guards comprising a series of vertical wire members with the ends of the vertical wire members of one guard bent toward the ends of the vertical wire members of the other guard and extending alongside each other, a heating element having an insulating base with holes in the top and bottom of said base to have the free ends of said wire members of said pair of guards project therethru to suspend said heating element between them and locking means provided in the top and bottom of said housing to engage said guards and hold said guards together with said heating element suspended between them.

5. In an electric toaster the combination of a housing having a pair of openings in the top and bottom thereof, a pair of guards comprising a series of vertical wire members with the ends of the vertical wire members of one guard bent toward the ends of the vertical wire members of the other guard and extending alongside each other, a heating element having an insulating base with holes in the top and bottom of said base to have the free ends of said pair of guards project therethru to suspend said heating element between them, and cross wire members connecting said vertical wire members at the top and bottom thereof and projecting from said guards to engage the holes in the top and bottom of said housing and hold said guards together with the heating element between them.

6. An electric toaster having a housing and a heating element within said housing, a toast carrier mounted to swing on said housing, a cover in back of said carrier and extending upwardly therefrom and having its upper portion pivotally supported on said carrier so as to swing therewith with the lower portion of the cover thereof adapted to swing toward and away from said carrier a cam slot in said housing and a cam lug carried by said cover to engage said cam slot and positively move said cover on said carrier on the movement of said carrier.

7. An electric toaster having a heating element, a toast carrier mounted to swing in front of said heating element near the bottom thereof, a substantially horizontal supporting ledge held fixed on said carrier at the bottom thereof, a cover pivotally supported on said carrier above said supporting ledge near the top of said heating element to permit the bottom of said cover to freely swing away from said supporting ledge near the bottom of said heating element with the supporting ledge held fixed in a substantially horizontal position.

8. An electric toaster having a heating element, a toast carrier mounted to swing in front of said heating element, a substantially horizontal supporting ledge provided on said toast carrier, a pair of substantially vertical arms extending upwardly from the ends of said supporting ledge and a cover pivotally supported by said arms above said supporting ledge to have the upper portion of said cover held substantially fixed on the carrier and permit the lower portion of the cover to swing away from the carrier.

9. A toaster comprising a housing with a heating element supported therein and a toast carrier mounted to swing on said housing in front of said heating element, a cover pivotally supported with its upper portion on said toast carrier and connected with its lower portion to said housing and means provided on said housing to move the lower portion of said cover toward said toast carrier on the swinging movement of said toast carrier away from said heating element.

10. A toaster comprising a housing having a heating element supported therein, a toast carrier mounted to swing on said housing in front of said heating element, a cover mounted to swing on said toast carrier, means connecting said cover with said housing and means provided on said housing and cooperating with said connecting means to draw said cover against said carrier on the swinging movement of said carrier in one direction.

11. A toaster comprising a housing having an open front and a heating element mounted therein, a toast carrier pivotally mounted to said housing in front of said heating element, a cover mounted to swing on said carrier and movable in front of said open front of said housing and said carrier, means connecting said cover with said housing and means provided on said housing and cooperating with said connecting means to permit a free movement of said cover away from said open front of said housing and said carrier and cause said cover to be positively moved back toward said open front and said carrier on the movement of said carrier.

12. In an electric toaster having a frame with a heating element supported in a substantially vertical position in the frame, a toast carrier pivotally mounted on said frame near the bottom of said heating element, a cover pivotally mounted to swing on said toast carrier above its pivotal mounting so as to have the lower end of the cover swing toward and away from the pivotal mounting of the toast carrier, means provided on said cover and engaging said frame to permit a limited free movement of the lower end of the cover away from the pivotal mounting of the toast carrier and means provided on said frame and cooperating with said cover to move the lower portion of said cover toward the pivotal mounting of said toast carrier on the swinging movement of said toast carrier with said cover away from said heating element.

13. In a toaster, a frame having a heating element disposed in a substantially vertical plane, a toast carrier pivotally mounted on said frame near the bottom of said heating element, a pair of radial arms at the ends of said toast carrier, a cover pivotally suspended from said pair of arms and overhanging the outer ends of said arms, and means provided on said frame and engaging said cover to move said cover toward said toast carrier on the swinging movement of said toast carrier.

14. In a toaster, a frame having a heating element disposed in a substantially vertical plane, a toast carrier mounted to swing in said frame in front of the lower end of said heating element, a cover pivotally suspended on said toast carrier and adapted to swing therewith and independently thereof, cam means provided on said frame and engaging said cover to positively swing said cover in one direction on the swinging movement of said toast carrier.

15. In an electric toaster, a frame having a heating element vertically disposed therein with a fixed guard in front thereof, a toast carrier, a substantially horizontal supporting ledge provided on said toast carrier in front of said guard, said toast carrier being pivotally mounted on said frame to permit the swinging of said supporting ledge from a substantially horizontal to a substantially vertical position, a cover carried by said toast carrier in front of said supporting ledge and mounted to swing thereon above said supporting ledge to hold the upper portion of the cover substantially fixed with relation to said supporting ledge and permit the bottom portion of the cover to freely swing toward and away from the supporting ledge with the ledge in a substantially horizontal position.

16. In an electric toaster the combination as set forth in claim 15 including means provided on said frame and cooperating with said cover to positively move said cover with relation to said supporting ledge on the swinging of said toast carrier on said frame.

ABE O. SAMUELS.